(12) United States Patent
Varndell et al.

(10) Patent No.: US 11,589,137 B2
(45) Date of Patent: Feb. 21, 2023

(54) METHOD FOR COLLABORATIVE COMMENTS OR METADATA ANNOTATION OF VIDEO

(71) Applicant: IPV LIMITED, Cambridge (GB)

(72) Inventors: James Varndell, Cambridge (GB); Alex Ferris, Cambridge (GB); David Cole, Cambridge (GB)

(73) Assignee: IPV LIMITED, Cambridge (GB)

( * ) Notice: Subject to any disclaimer, the term of this patent is extended or adjusted under 35 U.S.C. 154(b) by 0 days.

(21) Appl. No.: 15/565,289

(22) PCT Filed: Apr. 7, 2016

(86) PCT No.: PCT/GB2016/050977
§ 371 (c)(1),
(2) Date: Oct. 9, 2017

(87) PCT Pub. No.: WO2016/162678
PCT Pub. Date: Oct. 13, 2016

(65) Prior Publication Data
US 2018/0176661 A1    Jun. 21, 2018

(30) Foreign Application Priority Data
Apr. 7, 2015  (GB) .................... 1505864

(51) Int. Cl.
*H04N 21/83*   (2011.01)
*G06F 16/78*   (2019.01)
(Continued)

(52) U.S. Cl.
CPC ............. *H04N 21/83* (2013.01); *G06F 16/78* (2019.01); *G06F 40/169* (2020.01);
(Continued)

(58) Field of Classification Search
CPC . G06F 3/00; G06F 16/78; G06F 40/04; G06F 16/04; G06F 16/40; G06F 40/169;
(Continued)

(56) References Cited

U.S. PATENT DOCUMENTS

| 2002/0026462 A1* | 2/2002 | Shotton, Jr. | ....... G06F 17/30864 715/239 |
| 2003/0191638 A1* | 10/2003 | Droppo | ............... G10L 21/0208 704/228 |

(Continued)

FOREIGN PATENT DOCUMENTS

WO    2012/129336 A1    9/2012

OTHER PUBLICATIONS

International Search Report, dated Jan. 7, 2016, issued in International Application No. PCT/GB2016/050977.

*Primary Examiner* — Jennifer N Welch
*Assistant Examiner* — Qi Wan
(74) *Attorney, Agent, or Firm* — Saul Ewing LLP

(57) ABSTRACT

A logger or annotator views video in a window or user interface (UI) of a computing device and enters time-stamped metadata or commentary; that metadata or commentary is then automatically displayed on a timeline or other time-based index in a different window or user interface of a second computing device used by a viewer or editor of that video. The metadata or commentary is represented by a marker or icon appearing on a timeline displayed in the window or user interface of a second computing device, and the metadata or commentary is shown when the viewer or editor selects that marker or icon.

31 Claims, 18 Drawing Sheets

(51) Int. Cl.

| | |
|---|---|
| *G06F 40/169* | (2020.01) |
| *H04N 21/472* | (2011.01) |
| *H04N 21/84* | (2011.01) |
| *H04N 21/4788* | (2011.01) |
| *H04N 21/8547* | (2011.01) |
| *H04N 21/488* | (2011.01) |
| *G11B 27/031* | (2006.01) |
| *G11B 27/34* | (2006.01) |
| *G06F 40/197* | (2020.01) |
| *G06F 40/242* | (2020.01) |
| *H04N 21/43* | (2011.01) |
| *H04N 21/2187* | (2011.01) |

(52) U.S. Cl.
CPC ......... *G06F 40/197* (2020.01); *G06F 40/242* (2020.01); *G11B 27/031* (2013.01); *G11B 27/34* (2013.01); *H04N 21/2187* (2013.01); *H04N 21/43074* (2020.08); *H04N 21/4788* (2013.01); *H04N 21/47205* (2013.01); *H04N 21/4882* (2013.01); *H04N 21/84* (2013.01); *H04N 21/8547* (2013.01)

(58) Field of Classification Search
CPC .......... H04N 9/80; H04N 21/00; H04N 21/83; G06Q 10/101; G11B 27/00
See application file for complete search history.

(56) References Cited

U.S. PATENT DOCUMENTS

| | | | | |
|---|---|---|---|---|
| 2004/0073536 | A1* | 4/2004 | Smith-Semedo | G06F 1/14 |
| 2006/0018516 | A1* | 1/2006 | Masoud | G06T 7/254 |
| | | | | 382/115 |
| 2006/0236241 | A1* | 10/2006 | Harada | G06Q 10/10 |
| | | | | 715/700 |
| 2007/0245243 | A1* | 10/2007 | Lanza | G06Q 30/0277 |
| | | | | 715/723 |
| 2007/0288260 | A1* | 12/2007 | Burke | G06Q 50/22 |
| | | | | 705/2 |
| 2008/0115050 | A1* | 5/2008 | Oliver | G01C 21/20 |
| | | | | 715/210 |
| 2009/0164904 | A1* | 6/2009 | Horowitz | G06F 16/78 |
| | | | | 715/723 |
| 2010/0121157 | A1* | 5/2010 | Espina | A61B 5/411 |
| | | | | 600/301 |
| 2011/0153620 | A1* | 6/2011 | Coifman | G10L 15/065 |
| | | | | 707/748 |
| 2011/0158605 | A1 | 6/2011 | Bliss et al. | |
| 2011/0213616 | A1* | 9/2011 | Williams | G10L 15/18 |
| | | | | 704/257 |
| 2011/0246530 | A1* | 10/2011 | Malafsky | G06N 5/022 |
| | | | | 707/794 |
| 2012/0151046 | A1* | 6/2012 | Weiss | G06F 21/604 |
| | | | | 709/224 |
| 2013/0089248 | A1* | 4/2013 | Remiszewski | G06K 9/00127 |
| | | | | 382/128 |
| 2013/0145269 | A1* | 6/2013 | Latu | G06F 3/048 |
| | | | | 715/720 |
| 2013/0254184 | A1 | 9/2013 | Ellsworth et al. | |
| 2013/0326352 | A1* | 12/2013 | Morton | G06F 3/0484 |
| | | | | 715/719 |
| 2014/0033068 | A1* | 1/2014 | Gupta | G06Q 10/103 |
| | | | | 715/751 |
| 2014/0063174 | A1* | 3/2014 | Junuzovic | G06Q 10/101 |
| | | | | 348/14.02 |
| 2014/0081690 | A1* | 3/2014 | Winters | G06Q 10/063114 |
| | | | | 705/7.15 |
| 2014/0349750 | A1* | 11/2014 | Thompson | A63F 13/537 |
| | | | | 463/31 |
| 2015/0074507 | A1* | 3/2015 | Riediger | G06F 17/30 |
| | | | | 715/230 |
| 2015/0244943 | A1* | 8/2015 | Brown | G06F 17/30265 |
| | | | | 348/571 |
| 2016/0042070 | A1* | 2/2016 | Rossi | G06F 16/951 |
| | | | | 707/709 |
| 2016/0179940 | A1* | 6/2016 | Ashtiani | G06F 16/2282 |
| | | | | 707/739 |

* cited by examiner

METHOD FOR COLLABORATIVE COMMENTS OR METADATA ANNOTATION OF VIDEO

CROSS REFERENCE TO RELATED APPLICATIONS

This application claims the priority of PCT/GB2016/050977, filed on Apr. 7, 2016, which claims the benefit of priority to Great Britain Application No. GB 1505864.7, filed on Apr. 7, 2015, the entire contents of which are fully incorporated herein by reference.

BACKGROUND OF THE INVENTION

1. Field of the Invention

This invention relates to a method and system for annotating video. One application is in annotating video for sports video broadcasts in a non-linear editing environment so that an editor can rapidly scan and search the annotated video for specific video frames of relevance.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

A 'metadata annotation system' allows one or more human or automated users to mark up one or more video frames and associate metadata with those frames external to or inside a non-linear editing environment (NLE) on single or multiple media, such as video from multiple camera angles.

Existing systems allow a user to import those metadata annotations into an NLE via human initiated action. For example, using existing systems, the NLE user must take manual action to choose to import an edit decision list (EDL) file or select, via human initiated action, to import one or more metadata annotations into the NLE.

In contrast this invention provides updates to the NLE in real-time, as close as possible to the live playhead, such that no human initiated action is required by the NLE user to view and work with the metadata annotations in the NLE. Whilst we have described NLE prior art, this invention can be used outside of that context and can be used in many other kinds of applications.

SUMMARY OF THE INVENTION

The invention is a method of annotating video, in which a logger or annotator views that video in a window or UI of a computing device and enters time-stamped metadata or commentary;
and that metadata or commentary is then automatically displayed on a timeline or other time-based index in a different window or UI of a second computing device used by a viewer or editor of that video.
The method is implemented by a computer processor or processors.
Optional features include any one or more of the following:
Video is real-time video
Video is not raw video but a memory efficient proxy
Metadata or commentary is represented by a marker or icon appearing on the timeline or other time-based index displayed in the window or UI of the second computing device, and the metadata or commentary is shown when the viewer or editor selects that marker or icon or otherwise interact with the marker or icon to cause the metadata or commentary to be displayed
Window or UI of the second computing device includes a search function that enables the viewer or editor to search for specific terms in metadata or commentary
Window or UI of the second computing device returns or filters a list or set of video or clips that each include metadata or commentary matching a specific search term
The viewer or editor can subscribe to or define metadata or commentary of interest and any video or clips that are annotated to include the metadata or commentary of interest is then automatically notified, listed or otherwise provided to the viewer or editor
Automatic display of metadata or commentary in the second computing device used by the viewer or editor occurs in real-time and is frame accurate, i.e. identical to the frames seen by the logger or annotator
Metadata or commentary is automatically displayed in the different window or UI when the logger or annotator makes an affirmative action, for example selects 'save' option or equivalent or some other button or tile
Method is scalable to any number of loggers or annotators and enables large scale collaboration
Method fuses time-stamped metadata or commentary from multiple different loggers or annotators
Editor's window or UI (i.e. the window or UI on the second computing device) enables rapid definition of clip boundaries, e.g. in and out points, based on time-stamped metadata or commentary
System automatically generates clip boundaries, e.g. in and out points, based on time-stamped metadata or commentary
Loggers or annotators enter metadata or commentary by selecting words from a controlled vocabulary displayed on their window or UI to ensure consistency and eliminate ambiguity
Controlled vocabulary is represented by a set of buttons, tiles or icons, each with a single word or name from the controlled vocabulary
When a logger or annotator selects a word or name on a button or tile, then that word or name is automatically saved and displayed on the window or UI of the second computing device
Controlled vocabulary is derived from a semantic description or schema
Controlled vocabulary can be fixed or can be dynamically updated
Controlled vocabulary is hierarchical and enables searching in respect of concepts or items at any level of the hierarchy (e.g. at the top of the hierarchy for football could be 'goals', and one level down could be 'goals scored from a breakaway'; 'goals scored passing defence'; 'goals scored on the volley', 'goals scored by striker' etc. so you could search for specific types of goal, or search more generally for all goals).
Controlled vocabulary is mined and managed (e.g. cleansed of duplicates, simplified to give consistency) automatically
Controlled vocabulary is in part derived from or enriched by social media content

- Controlled vocabulary includes domain specific data, such as information on different sports team and players on each team for a specific game or event captured by the video being annotated
- Domain specific data is obtained from several different sources and aggregated, and the aggregated data is then analysed and modified to ensure consistency
- The controlled vocabulary is automatically stamped or identified with provenance data that includes time, thus allowing reversion to the precise version of the controlled vocabulary
- Time stamping a controlled vocabulary, or items within a controlled vocabulary, enables the annotator etc. to revert to a required version and also to update or correct any entry
- Time stamping a controlled vocabulary, or items within a controlled vocabulary, enables reduced cost of ownership because it gives a chronological view of the metadata or commentary for a given asset in the controlled vocabulary
- The chronological view is mined for interesting graphs of relationships and analysis, for example statistics—for example, that this player historically has played for these teams and at the same time as this player
- The controlled vocabulary provenance data is included in log entries such that they can be ranked for accuracy and filtered or weighted, e.g. this data was from a manual process and has a weighting of 90% vs. this data was from an automated facial recognition identifying the player and has a ranking of 60%
- Method is used to train a machine learning system or classifier
- Metadata or commentary is generated automatically from sensors (e.g. sensors that detect passage of race cars; sensors that detect whether a ball has entered the goal; sensors that detect whether a tennis ball is in or out of the court; sensors that detect when a crowd is cheering loudly etc.). Note here that this is metadata or commentary that is additional to the metadata or commentary generated by the loggers or annotators. However, in another aspect of the invention, it is possible that the metadata or commentary is only or exclusively generated automatically from sensors.
- Sensors that enable automatic generation of metadata or commentary are IoT sensors
- Sensors that enable automatic generation of metadata or commentary receive a social media feed
- Sensors that enable automatic generation of metadata or commentary receive a media data feed that is noisy and the method includes the step of cleaning that data, including one or more of filtering, interpretation and substitution of that data, where substitution includes substituting a word or words for a single alias
- The method includes the step of simplifying the data, for example to remove diacritics such as umlauts and accents to present a common searchable name tag.
- A rules engine equipped with the rules for a specific domain (e.g. tennis, football, basketball etc.) interprets the sensor data and interprets their output to generate automatically metadata or commentary that is meaningful in the context of that domain (e.g. for tennis—'a 150 mph ace' could be generated from the court-side sensors that measure tennis ball speed; ' a double fault' could be generated from the court-side sensors that determine if a tennis ball lands within the court; for football 'goal!' could be generated from goal-mouth sensors that determine if the ball passes the goal posts; for basketball 'score!' '% possession', 'shot clock start' etc.)
- Window or UI of the second computing device is an editing UI that aggregates all incoming data needed to edit the video
- Editing UI presents data that has been aggregated at a remote service
- Editing UI enables the editor to scroll along a timeline or other time-based index and to view metadata or commentary associated with different times along the timeline or time-based index.
- The logger or annotator's window or UI includes a window showing video and also a grid, list or arrangement of buttons, tiles or icons for the words and/or names in the controlled vocabulary
- The logger or annotator's window or UI includes tools to enable the logger or annotator to define in and out points or stop and start points for a video clip or video section associated with specific metadata or commentary
- Editing UI is part of an editing environment or tool such as a NLE, and the tool automatically generates a highlights reel, or other sequence or clip or clips of video that has defined characteristics
- Video shown in the window or UI is taken from the same camera that provides the video shown on the second computing device;
- Video shown in the window or UI is taken from a different camera from the camera that provides the video shown on the second computing device. So for example in a security camera system, if the metadata or commentary (e.g. 'Intruder alert') is created in relation to a video from a camera pointing at a gate, then that metadata or commentary, or the related marker or icon, could also appear on a camera feed showing the front door.
- The video is from one or more cameras filming a sports event
- The video is from one or more cameras filming a lesson or educational event
- The video is from one or more cameras filming a news event
- The video is from one or more security cameras
- The video is from one or more courtroom cameras
- The video is from one or more cameras filing a medical examination or medical procedure
- The video is from a video sharing website, such as YouTube.

BRIEF DESCRIPTION OF THE FIGURES

The invention is described using the following Figures.

DETAILED DESCRIPTION

One implementation of this invention is a real-time metadata annotation system to provide real-time updates to an editing timeline in a non-linear editing environment (NLE). The system receives input from a collaborative metadata annotation system which allows annotation of single or multiple video frames created against single or multiple live video streams or files. The system produces, as output, one or more annotations on an NLE timeline. Via user configuration, the system can make one or more intermediate calculations on the annotations after creation and before observation by an NLE user. Certain embodiments of the system can use the created annotations to automatically create new video content without the requirement for user input.

Figure 1:
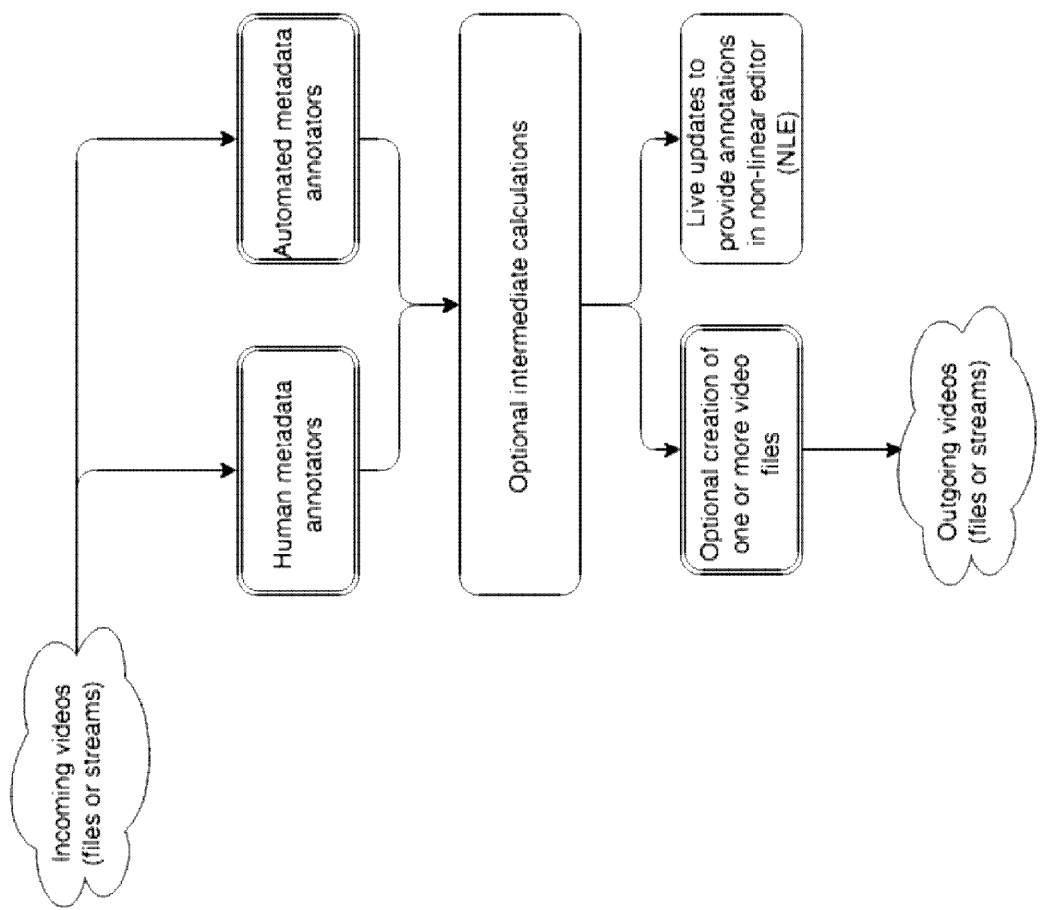
FIG. 1 is a flow chart depicting the operation of the system.

FIG. 1 shows a flowchart depicting the operation of the system. As input, the system receives one or more incoming videos files or streams, these are then annotated by one or more human or automated metadata annotators. The system collates these metadata annotations and may optionally perform one or more intermediate calculations based on the metadata annotations. The resulting metadata annotations are automatically added to the NLE timeline requiring no action from the editor to initiate the import of the metadata annotations. Additionally, the system may optionally create one or more video files based on the metadata annotations.

Figure 2:
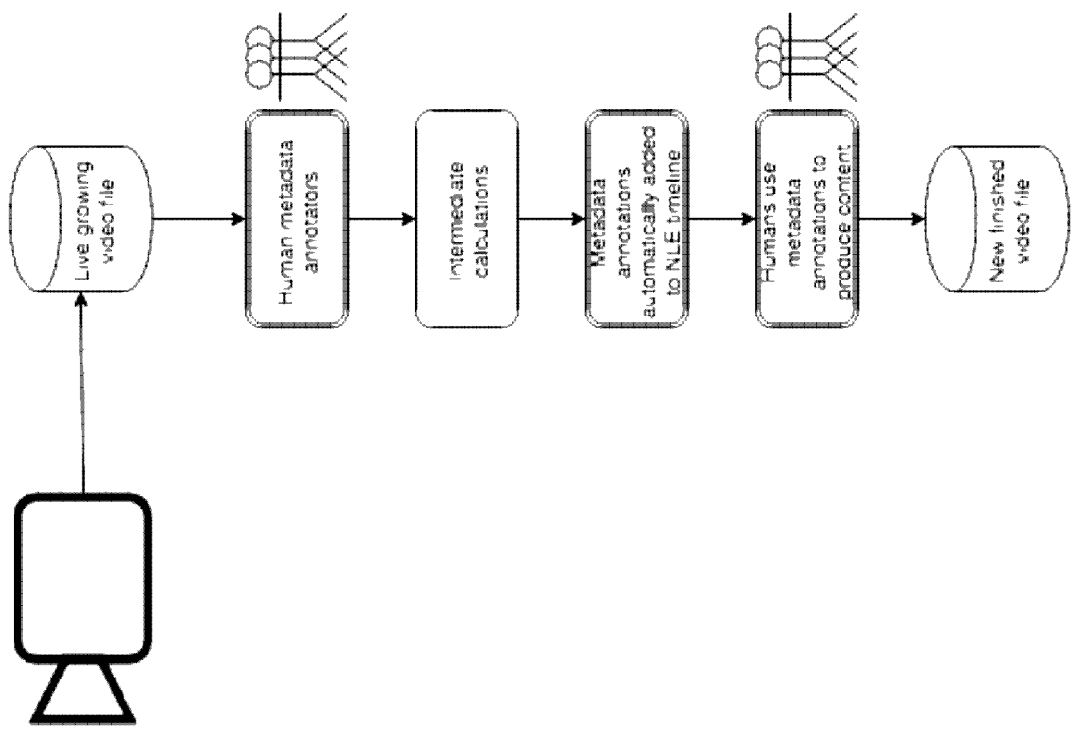
FIG. 2 is a flow chart depicting the operation of the system in a sports production environment.

FIG. 2 shows a flowchart depicting the system in use in a sports production environment. For the purpose of this use case description we will assume that the sports event is a basketball game, however, it could equally be any sports, news, reality TV, live stage event or other real-time, fast turn-around production. We will also assume that the output video file is a highlights package for the basketball game.

Firstly, a camera captures footage of the basketball game. This footage is stored in a live growing video file. In this context a live growing video file is one which can be written to by the camera and simultaneously read from by a machine. An example use case for a live growing video file is to allow a number of human operators to watch a basketball game 'live' via a web-based video player. For the purpose of this use case we will assume the camera has captured footage of LeBron James scoring a slam dunk.

The live footage from the basketball game is observed by an editor using an NLE and it is simultaneously passed on to a number of human metadata annotators—known colloquially as 'loggers'—these operators use a computer system to mark up interesting sections of the game such as dunks, blocks and fouls. Metadata is added to these sections to form a metadata annotation, for example, the annotation shown by Table 1. Table 1 describes footage containing a slam dunk by LeBron James between time-codes 00:15:30:12 and 00:15:35:21, this action in the footage is of high quality and has been awarded a 5 star rating by the annotator. Note that the property names (Player, Action) and values (LeBron James, Slam Dunk) are examples of terms derived from a controlled vocabulary.

TABLE 1

| Example metadata annotation | |
| --- | --- |
| In Point | 00:15:30:12 |
| Out Point | 00:15:35:21 |
| Player | LeBron James |
| Action | Slam Dunk |
| Rating | 5 Stars |

Once the system receives a metadata annotation it performs a number of intermediate calculations to determine whether the content is of interest to an editor. Each intermediate calculation is configurable, however, for the purpose of this use case we will assume that the system is looking for content rated greater than 4 stars; the slam dunk annotation meets this rating requirement.

As previously identified, an editor is watching the basketball footage live from within an NLE.

Now, the system takes the worthy metadata annotation and automatically adds it to the NLE timeline in the appropriate temporal location. For the annotation to be displayed on the NLE timeline no action is required by the editor, the annotation is automatically added to the timeline by the system.

At this time the editor can see the new slam dunk annotation on the timeline and can choose to include this in the highlights package which he or she is creating. We will assume that the editor chooses to add LeBron James' slam dunk to the highlights package.

Once the editor is satisfied with the highlights package they can choose to export this as a new video file. Having followed this use case the output highlights package will contain a slam dunk from LeBron James.

An additional embodiment includes a user working in the NLE with completed segments of the media. The NLE user is alerted to a new segment arriving in his working folder, often referred to as a bin. In this instance the "loggers" are annotating groups of frames depicting actions that the NLE user has subscribed to. Based on intermediate calculations the specific actions subscribed to by the NLE user are filtered and automatically appended to his bin for consideration on the production timeline, while the live event is still in progress.

FIG. 3-18 depict another use case where the sports event is football.

Figure 3:
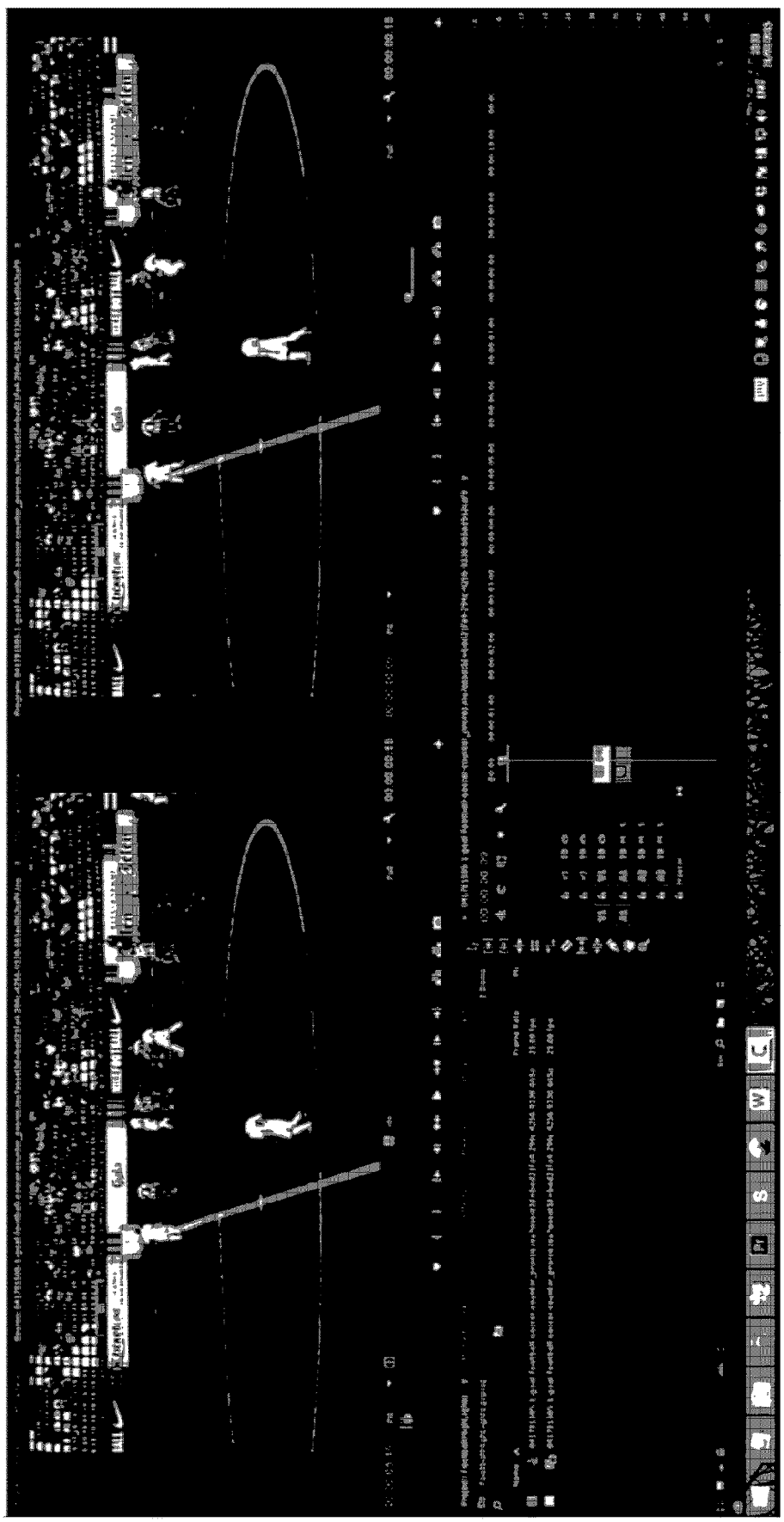
FIG. 3 shows the non-linear editing (NLE) UI.
Figure 4:
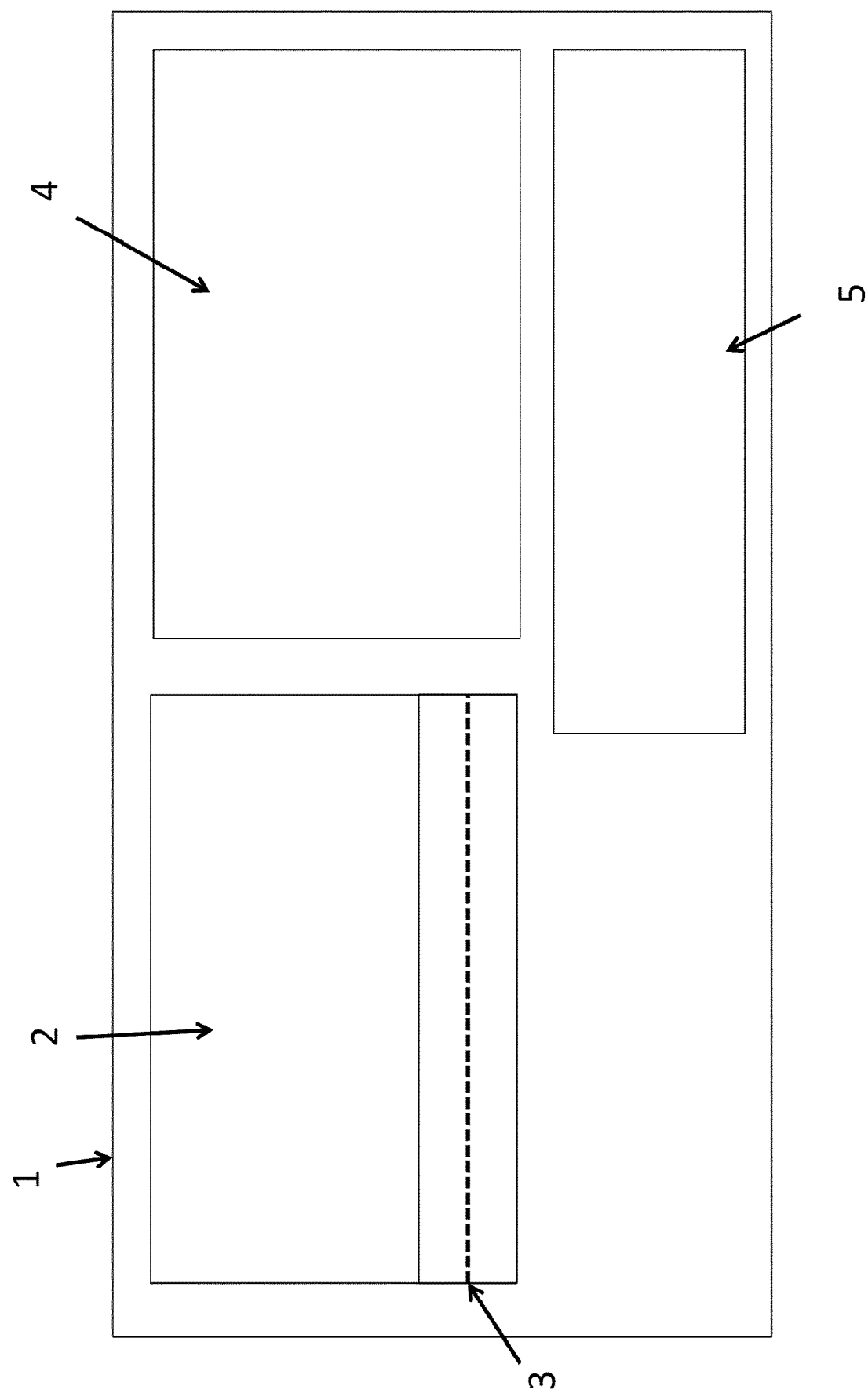
FIG. 4 is a wireframe corresponding to FIG. 3.

FIG. 3 shows the NLE screen that the editor uses—this is the window or UI on the second computing device as described in the Summary of the Invention section above. A wire-frame equivalent is shown in FIG. 4. The NLE screen is indicated generally at 1. The NLE user interface includes various windows: the incoming video being reviewed and edited is shown in the left-hand window 2. A timeline 3 sits underneath window 2; the editor can move a control icon to scroll forward and backwards through video shown in the window 2. The output, edited video is shown in window 4. Various lines of control information are included within window 5.

Figure 5:
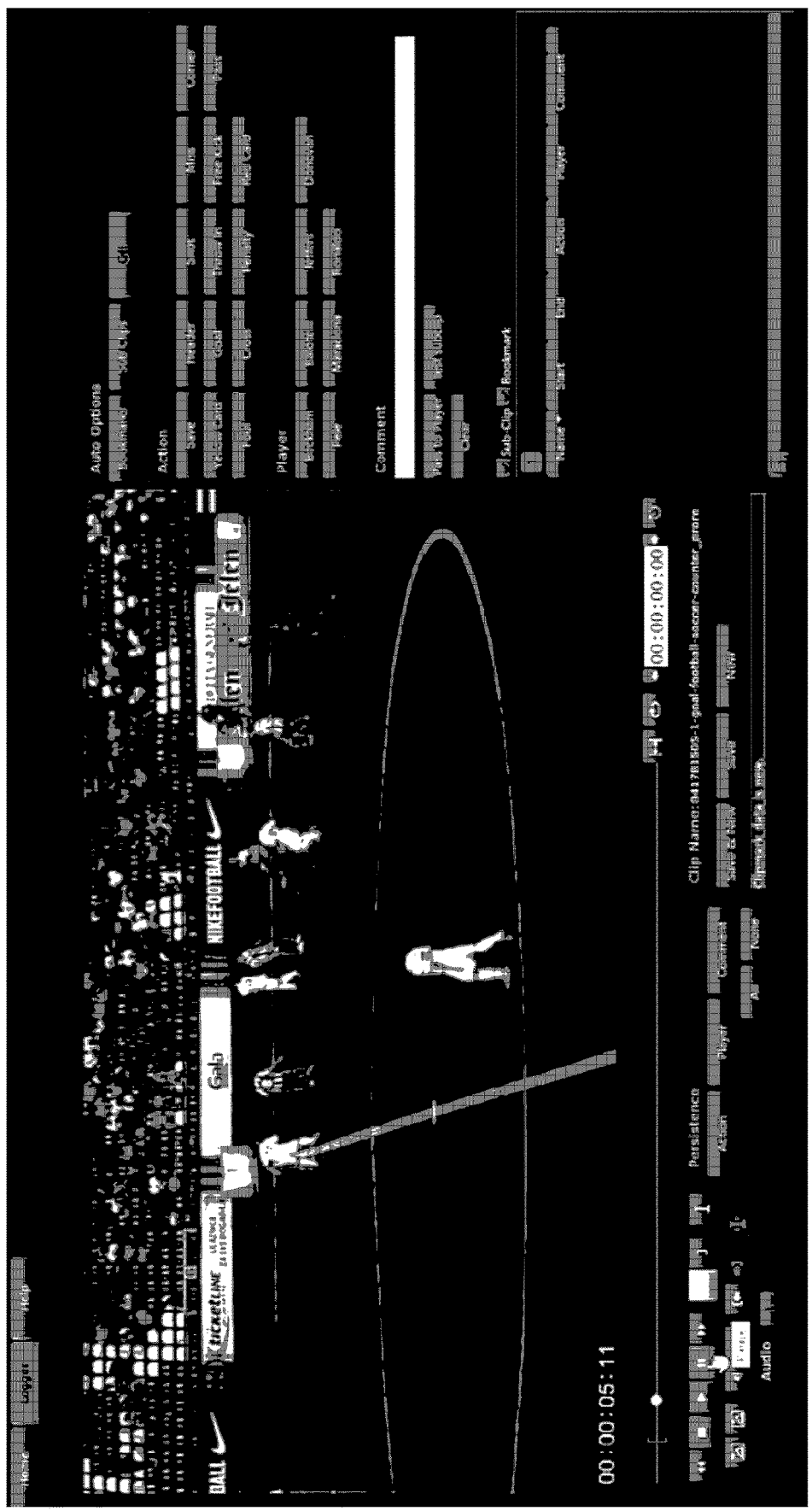
FIG. 5 shows the logger's or annotator's UI.
Figure 6:
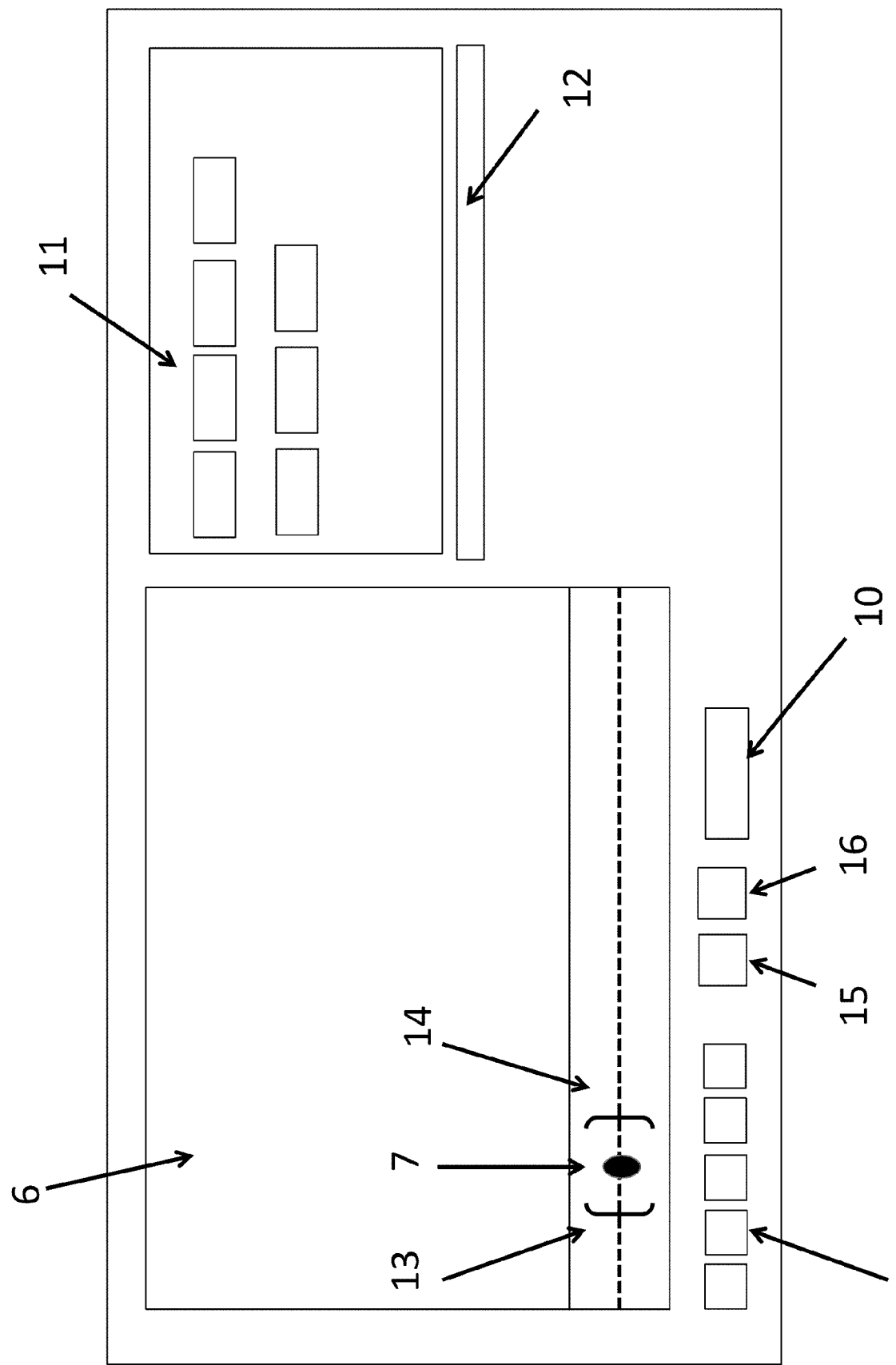
FIG. 6 a wireframe corresponding to FIG. 5.

FIG. 5 shows the screen used by remote loggers or annotators. A wire-frame equivalent is shown in FIG. 6. Video is shown in window 6; the logger can move a cursor 7 along time line 3 to select different moments in the video. Control buttons 9 (rewind, stop, play, pause, fast-forward) are under the video window 6, as are 'in' and 'out' buttons 15, 16 to set the start and end times of a video clip created by the editor. 'Save& New', 'Save' and 'New' buttons 10 are also under the video window 6. To the right of the video window 6 is a grid of buttons 11. Each button is a word from the controlled vocabulary. In this case, the controlled vocabulary panel is divided into a top half, with 'Action' words, and a bottom half, with 'Player' names. In this example, the Action words are:

Save, Header, Shot, Miss, Corner, Yellow Card, Goal, Throw in, Free kick, Pass, Foul, Cross, Penalty, Red card.

The Player names are:

Beckham, Balotelli, Jeffers, Donovan, Pele, Maradona, Ronaldo (of course, these names are just illustrative—in reality, they would be the players actually playing in the game featured in the video).

Figure 7:
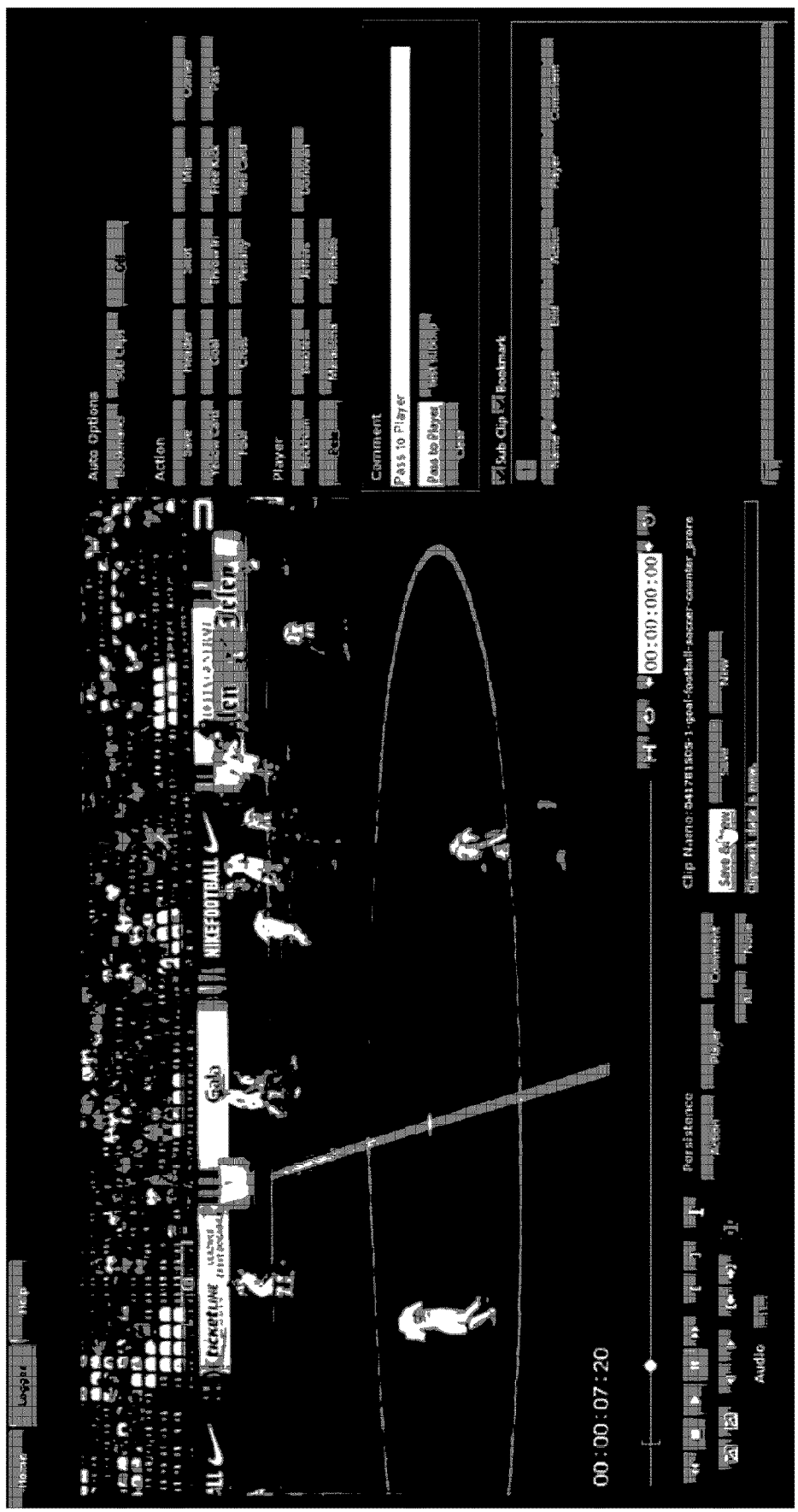
FIG. 7 shows the logger's or annotator's UI as the logger saves an annotation 'Pele Pass to Player

By including common actions, all defined by a controlled vocabulary, and selectable by simply selecting the associated button, the workflow or process for generating comments is very fast, especially with a touch screen display. For example, to enter the annotation relating to player Pele passing the ball to another player, the logger just presses the two keys 'Pele' then ' Pass'. The logger then typically sets the start point for the clip or video segment that should be annotated with "Pele—pass to player" using the start button 15 and endpoint button 16. These start and endpoints are shown on the video timeline with the '[' symbol 13 and the ']' symbol 14. The annotation appears in window 12, as shown in FIG. 7. The corresponding wireframe is FIG. 8, and the text is notionally represented by the 'XXXXX' in the comment field 12.

Figure 8:
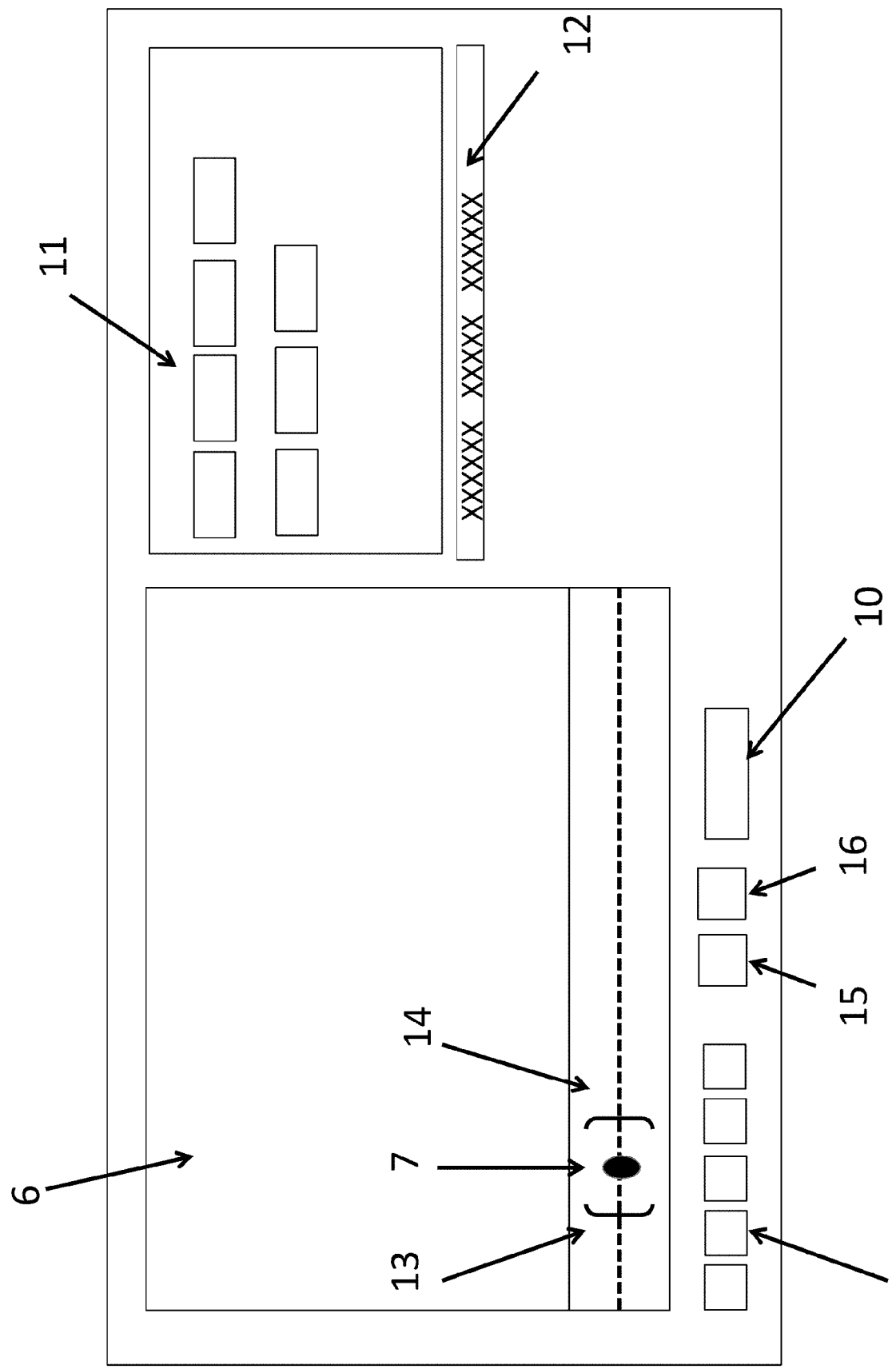
' FIG. 8 is a wireframe corresponding to FIG. 7.
Figure 9:
FIG. 9 shows the editor's UI immediately before the logger has saved the annotation 'Pele Pass to Player'.
Figure 10:
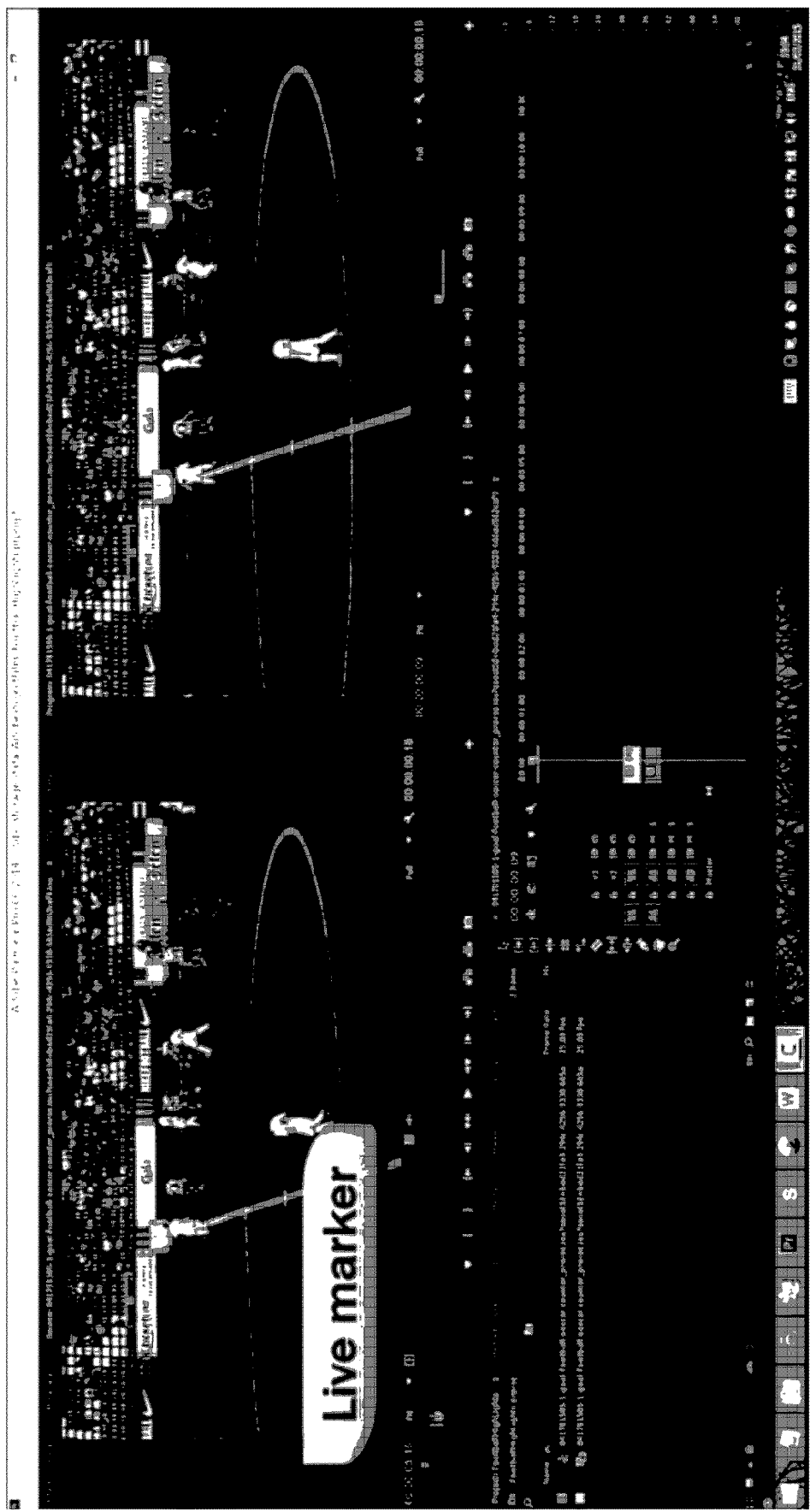
FIG. 10 shows the editor's UI immediately after the logger has saved the annotation 'Pele Pass to Player', showing a new 'Live Marker' icon on the timeline associated with that event.
Figure 11:
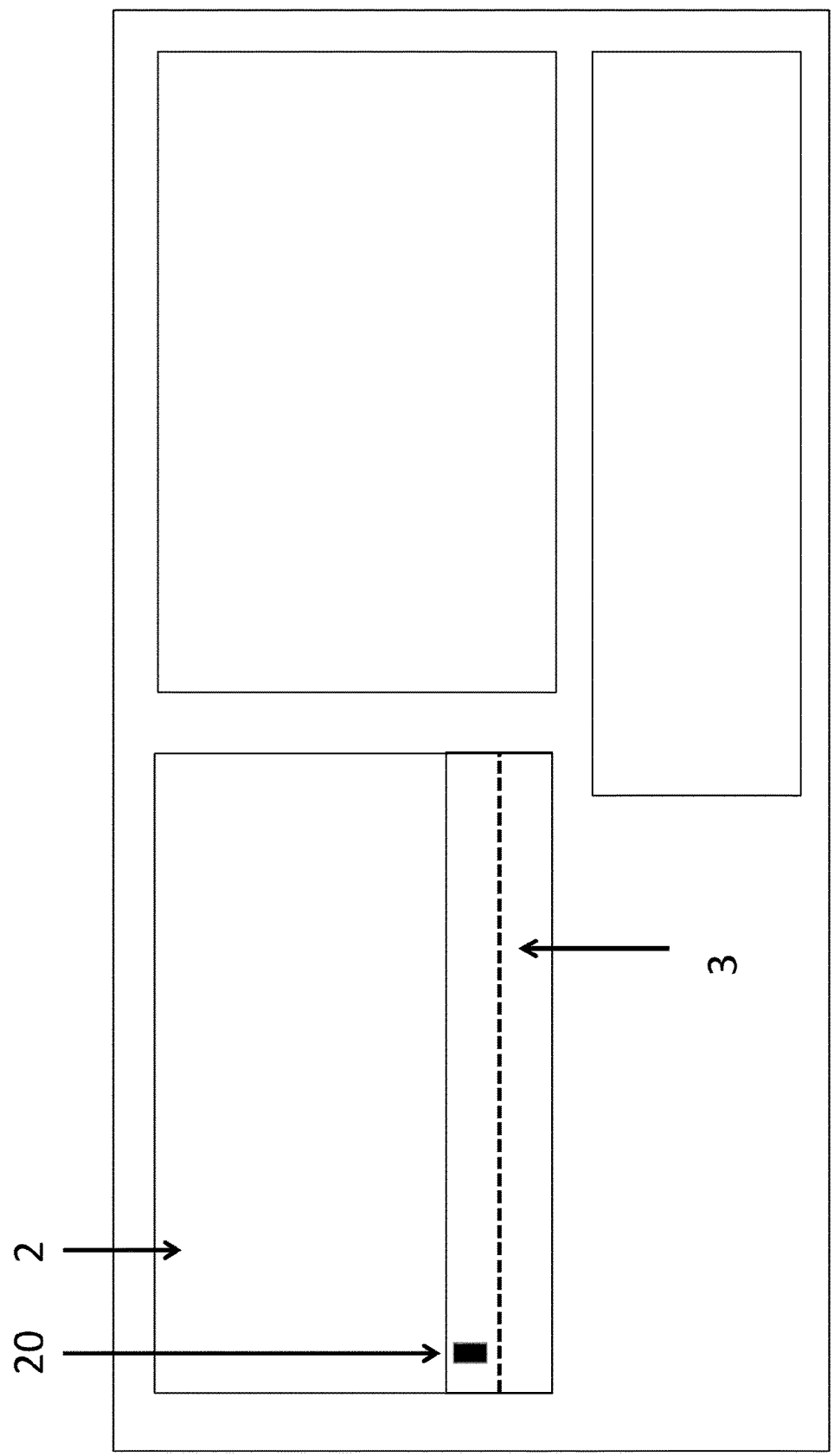
FIG. 11 is a wireframe corresponding to FIG. 10.
Figure 12:
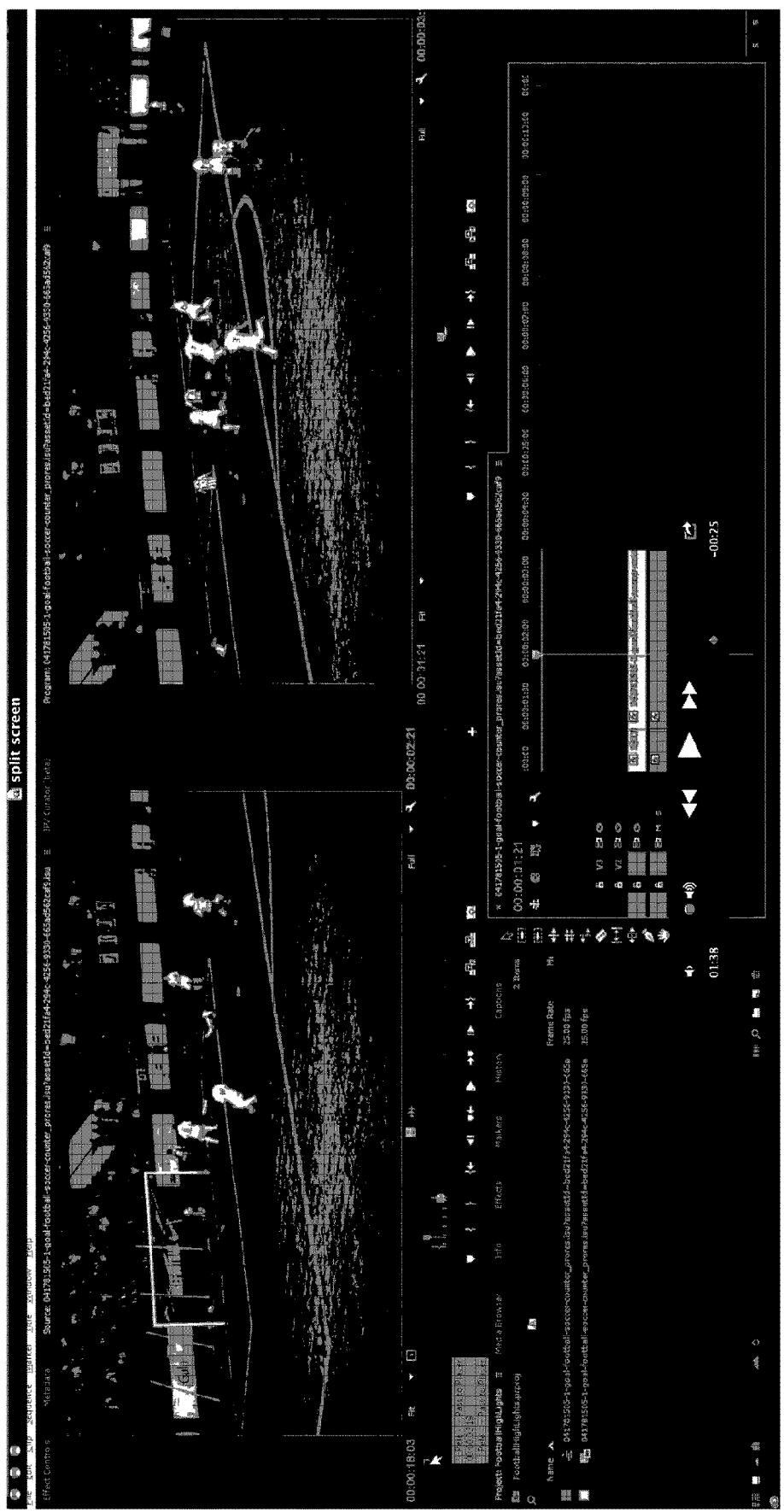
FIG. 12 shows how the text of the annotation 'Pele Pass to Player' is revealed by the editor hovering his cursor over the Live Marker.
Figure 13:
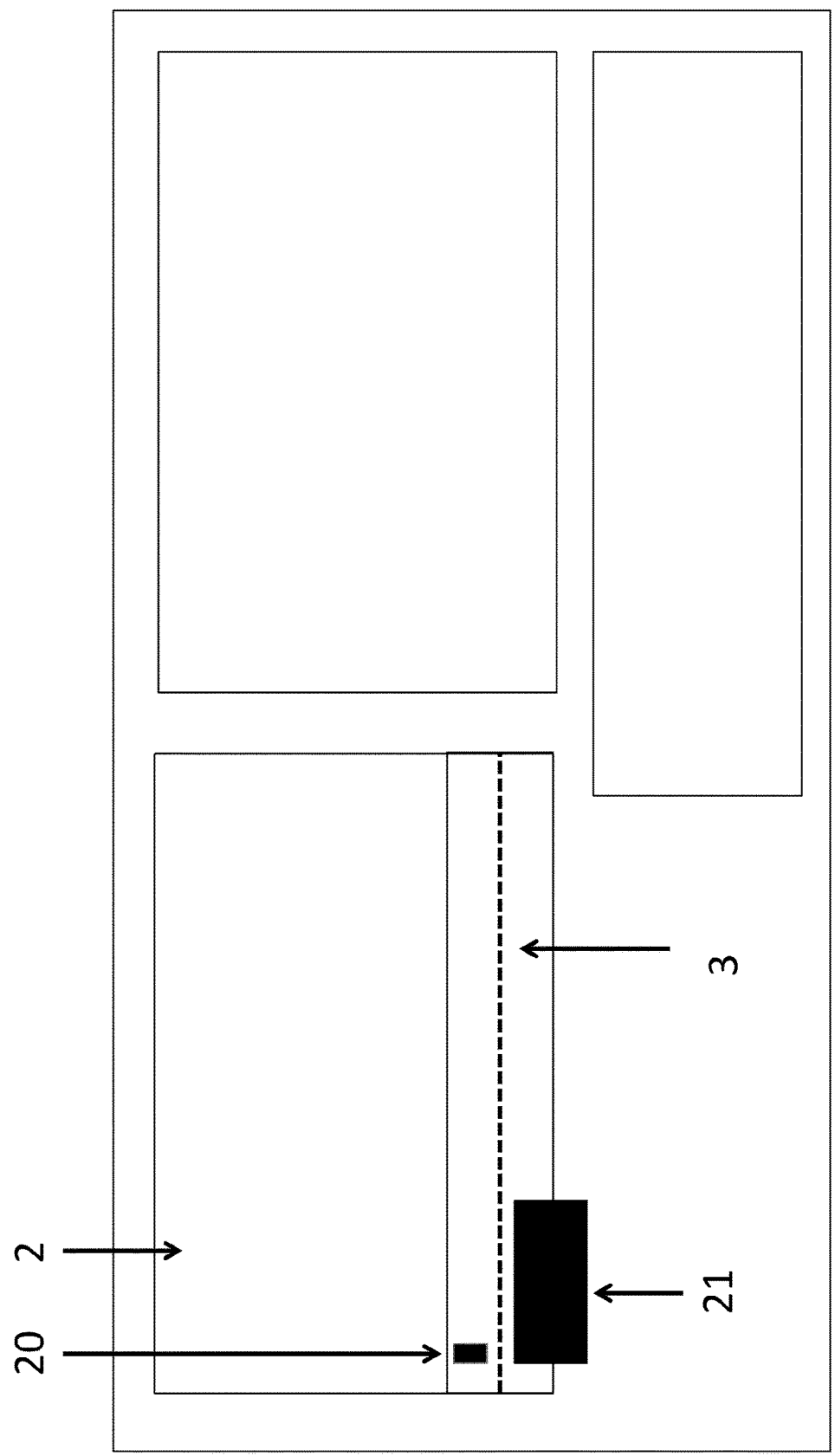
FIG. 13 is a wireframe corresponding to FIG. 12.

When the user selects the 'Save+New' button 10, as shown in FIG. 7 and FIG. 8, then the Pele—pass to player" annotation created by the logger and the related start and end-points for the associated video is automatically passed to the NLE—there is no need for the editor to manually import that annotation or for the annotator to manually export it. So, the editor would be viewing incoming video, as shown in FIG. 9, and then a 'Live Marker' symbol 20 appears on the video timeline 3, as shown in FIG. 10, with associated wireframe FIG. 11. If the editor hovers over or selects the 'Live Marker' symbol 20, then a window pop-up with the annotation 'Pele Pass to Player', as shown in FIG. 12, with associated wireframe FIG. 13. All annotations are searchable by the editor.

Figure 14:
FIG. 14 shows the logger's or annotator's UI as the logger saves an annotation 'Pele Scores a Goal'.
Figure 15:
FIG. 15 shows the editor's UI immediately after the logger has saved the annotation 'Pele Scores a Goal', showing a new 'Live Marker' icon on the timeline associated with that event.
Figure 16:
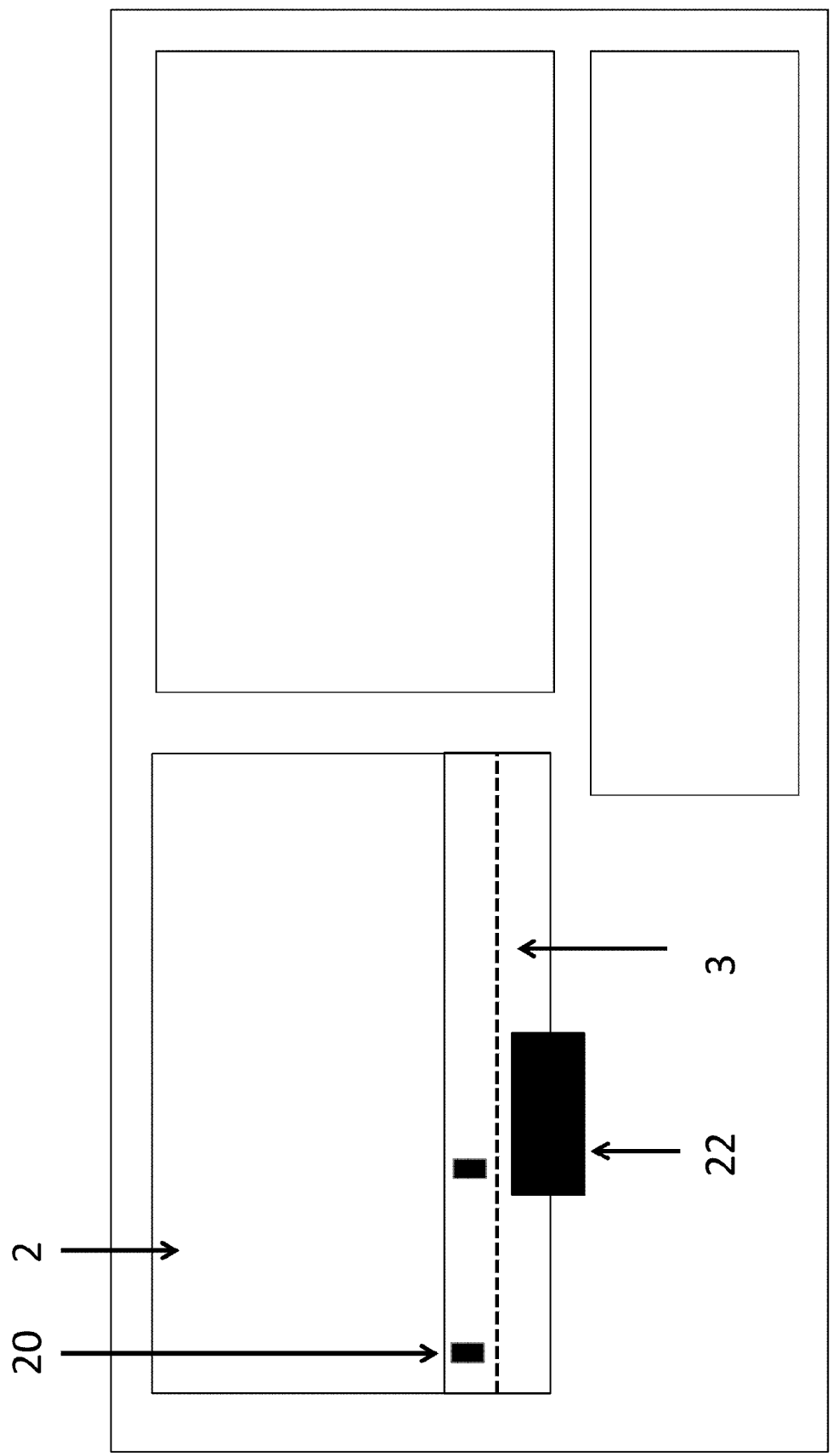
FIG. 16 is a wireframe corresponding to FIG. 15.
Figure 17:
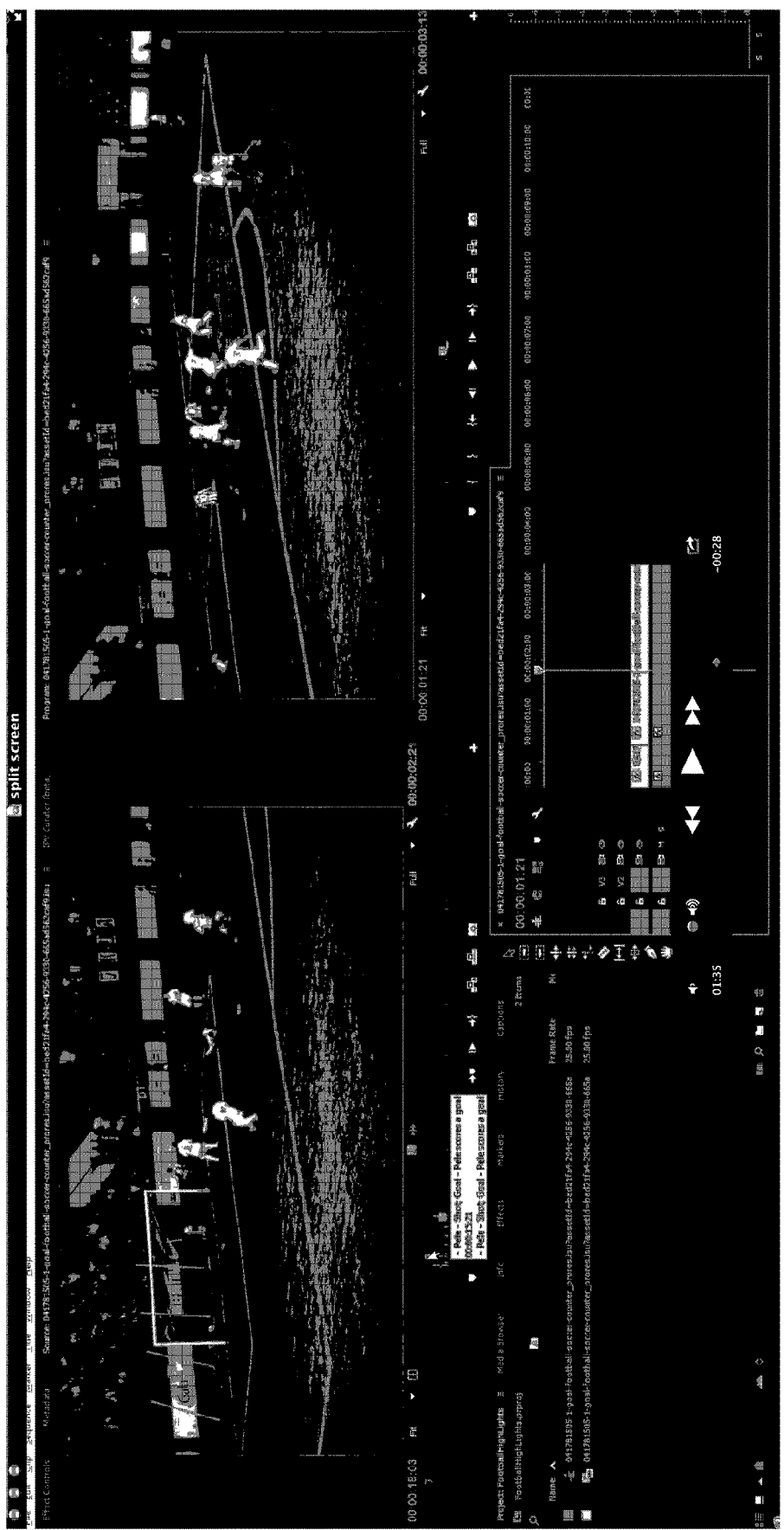
FIG. 17 shows the editor's UI as he creates a video clip of Pele scoring a goal.
Figure 18:
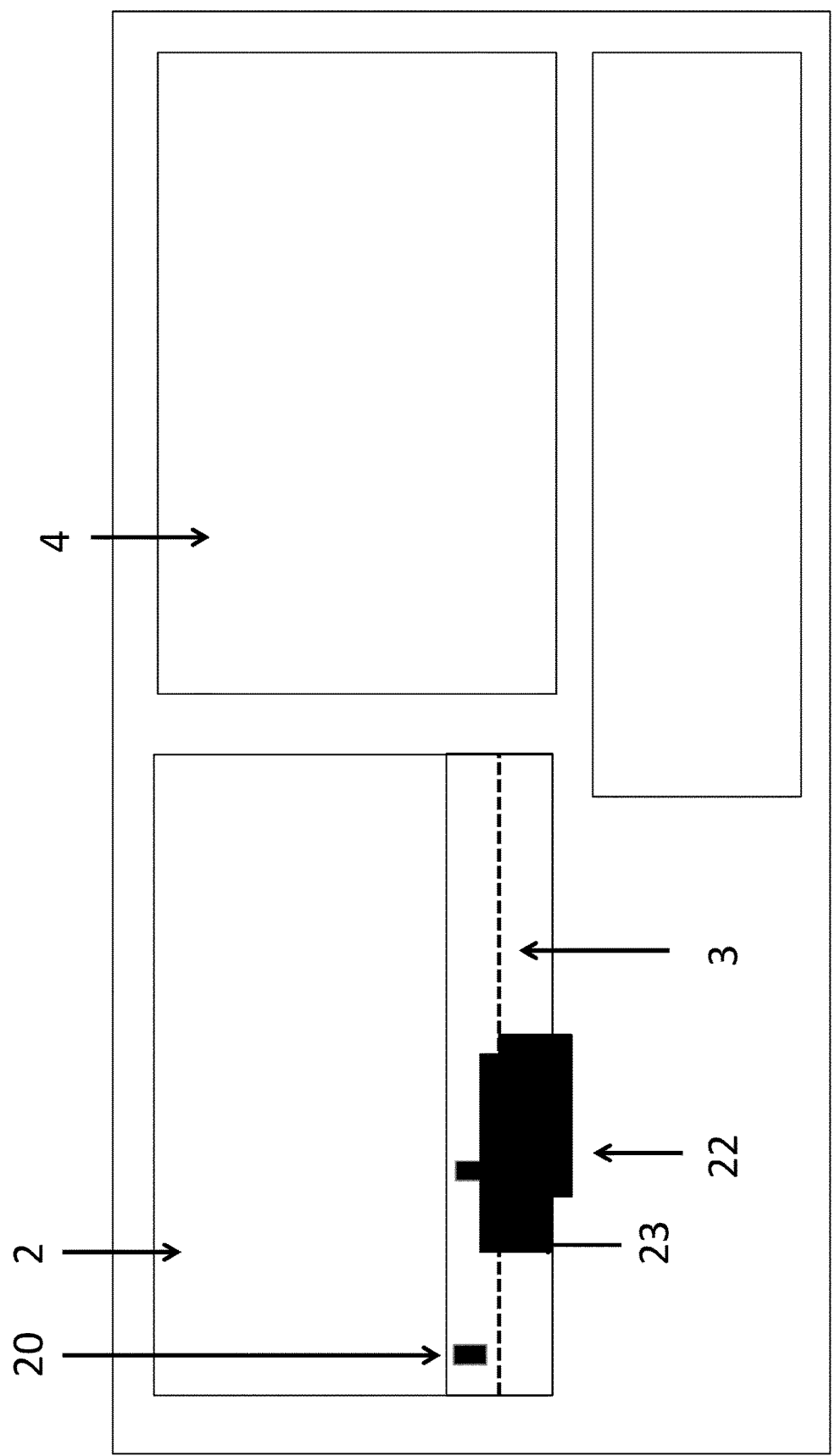
FIG. 18 is a wireframe corresponding to FIG. 17.

With FIG. 14, we return to the logger's screen. Here, Pele has scored a goal and the logger has selected the Action buttons 'Shot' and 'Goal' and the player button 'Pele'. The commentary box 12 hence automatically includes the text 'Pele scores a goal'. Appropriate 'In' and 'Out' marks are added to the video timeline by the logger. FIG. 15 shows that the editor's NLE screen has been automatically updated with a second 'Live Marker' 21 on timeline 3. As the editor hovers over or selects the Live Marker symbol 21, then a window pop-up with the annotation 'Pele Scores a Goal', as shown in wireframe version of FIG. 15, namely FIG. 16. The editor can now rapidly create a video clip of just Pele scoring a goal, as shown in FIG. 17, with associated wireframe FIG. 18. The editor defines in and out points defining the clip, 23, and the editor can create and play that clip back in window 4 and rapidly include it in a set of highlight clips.

The same fundamental principles can be used in numerous other contexts.

Additional Use Cases

Security cameras: A security camera feed or feeds could be viewed simultaneously by dozens of different loggers, each able to enter an annotation like 'intruder' or 'front door' or 'armed' or 'cat' etc. with different keywords triggering different automated responses (e.g. 'armed intruder' could trigger an automated call to the police). By enabling a feed or feed to be watched by many different loggers, possibly in totally different locations, the level of the scrutiny will be much greater than with just a single person viewing the video feed. Also, the annotations can be used to train e.g. a deep learning system since you are providing unambiguous training data the deep learning system can use to associate with specific visual patterns and behaviours.

YouTube: YouTube videos could be annotated by millions of YouTube users, with an aggregator analyzing annotations and filtering the annotations to use only those annotations that are made in excess of a defined threshold. Ordinary users wishing to annotate a YouTube video will call up in their browser the logger tool, complete with controlled vocabulary tiles or buttons that are relevant to the subject of the video. This will enable crowd-sourced analysis and annotation of large numbers of videos and enable content to be searched more effectively (e.g. not just for specific names or titles, but for specific moments within a video).

Courtrooms—e.g. courtroom video is annotated with time-stamped metadata or commentary (e.g. 'dramatic moment', 'judge intervenes', 'witness breakdown' etc.) enabling an editor to rapidly generate an interesting clip or sequence of clips for a news bulletin.

Healthcare—e.g. a specialist physician could be annotating a video interview or examination of or procedure performed on a patient, or a video of a MRI scan. Another physician, perhaps a generalist, could be reviewing the annotated video; annotations could specifically describe clinically important aspects (e.g. a patient is describing their symptoms in a video and the annotator is entering possible diagnoses or other clinically significant comments at the related times in the video, enabling the generalist physician to scroll straight to the clinically important moments).

Monetising legacy video assets—provides a cost-effective way of annotating video since it draws on the power of collaboration—could be possible to crowd-source annotations of for example old newsreels or other types of images for which there are a sufficient number of members of the public willing and competent to annotate these images. This enables a Wikipedia-type crowd-sourced commentary for all video assets.

The invention claimed is:

1. A method of annotating real-time video in a non-linear editing environment (NLE), the method including the steps of:
   (i) a first computing device displaying the real-time video in the non-linear editing environment in a window or user interface (UI) of the first computing device, in which the real-time video is generated remotely to the first computing device, and receiving time-stamped metadata or commentary from entry from a logger or annotator at the first computing device, in which commentary is received from the logger or annotator, wherein the editor's window or UI of the non-linear editing environment on a second computing device enables definition of clip boundaries, e.g. in and out points, based on the time-stamped metadata or commentary, or wherein an editing application on the second computing device automatically generates clip boundaries, e.g. in and out points, based on the time-stamped metadata or commentary, and the receiving commentary comprising receiving selected words from a controlled vocabulary displayed on the window or UI at the first computing device to ensure consistency and eliminate ambiguity, in which the controlled vocabulary is automatically stamped with provenance data that includes time, or is identified with provenance data that includes time, wherein reversion to a precise version of the controlled vocabulary is possible;

in which the controlled vocabulary is derived from a semantic description or from a semantic schema;

(ii) automatically displaying the metadata or commentary on a timeline or other time-based index in a different window or user interface of the second computing device used by a viewer or editor of the real-time video; and the window or UI of the second computing device returns or filters a list or set of video or clips that each include metadata or commentary matching a specific search term.

2. The method of claim 1 in which the metadata or commentary is represented by a marker or icon appearing on a timeline displayed in the window or UI of the second computing device, and the metadata or commentary is shown when the viewer or editor selects that marker or icon or otherwise interacts with the marker or icon to cause the metadata or commentary to be displayed.

3. The method of claim 1 in which the window or UI of the second computing device includes a search function that enables the viewer or editor to search for specific terms in metadata or commentary.

4. The method of claim 1, including the step of receiving a subscription or definition from the viewer or editor respectively to subscribe to, or to define, metadata or commentary of interest in response to which any video or clips that are annotated to include the metadata or commentary of interest is then automatically notified, listed or otherwise provided to the viewer or editor.

5. The method of claim 1, in which the automatic display of metadata or commentary in the second computing device used by the viewer or editor occurs in real-time and is frame accurate, i.e. identical to the frames seen by the logger or annotator.

6. The method of claim 1, in which the metadata or commentary is automatically displayed in the different window or UI when the logger or annotator makes an affirmative action, for example selects 'save' option or equivalent or some other button or tile.

7. The method of claim 1, in which the method is scalable to any number of loggers or annotators and enables large scale collaboration.

8. The method of claim 1, in which the method fuses time-stamped metadata or commentary from multiple different loggers or annotators.

9. The method of claim 1, in which the real-time video is not raw video but a memory efficient proxy.

10. The method of claim 1, in which metadata is received from the logger or annotator by receiving selected words from a controlled vocabulary displayed on the window or UI at the first computing device to ensure consistency and eliminate ambiguity.

11. The method of claim 1, in which the controlled vocabulary is represented by a set of buttons, tiles or icons, each with a single word or name from the controlled vocabulary.

12. The method of claim 11 in which when a logger or annotator selects a word or name on a button or tile, then that word or name is automatically saved and displayed on the window or UI of the second computing device.

13. The method of claim 1, when used to train a machine learning system or classifier.

14. The method of claim 1, in which the metadata or commentary is generated automatically from sensors.

15. The method of claim 14, (i) in which the sensors are sensors that enable automatic generation of metadata or commentary, wherein the sensors are internet of things (IoT) sensors, or (ii) in which the sensors are sensors that enable automatic generation of metadata or commentary, wherein the sensors receive a social media feed, or (iii) in which the sensors are sensors that enable automatic generation of metadata or commentary, wherein the sensors receive a media data feed that is noisy and the method includes the step of cleaning that data, including one or more of filtering, interpretation and substitution of that data, where substitution includes substituting a word or words for a single alias.

16. The method of claim 14, in which the sensors are sensors that enable automatic generation of metadata or commentary, wherein the sensors receive a media data feed that is noisy and the method includes the step of cleaning that data, including one or more of filtering, interpretation and substitution of that data, where substitution includes substituting a word or words for a single alias, and in which the method includes the step of simplifying the data.

17. The method of claim 14 in which a rules engine equipped with rules for a specific domain interprets sensor data and interprets the sensors' output to generate automatically metadata or commentary that is meaningful in the context of that domain.

18. The method of claim 1, in which the window or UI of the second computing device is an editing UI that aggregates all incoming data needed to edit the real-time video.

19. The method of claim 18 in which (i) the editing UI presents data that has been aggregated at a remote service, or (ii) in which the editing UI enables the editor to scroll along a timeline or other time-based index and to view metadata or commentary associated with different times along the timeline or time-based index, or (iii) in which the logger or annotator's window or UI includes a window showing video and also a grid, list or arrangement of buttons, tiles or icons for the words and/or names in the controlled vocabulary.

20. The method of claim 18, in which the logger or annotator's window or UI includes a window showing video and also a grid, list or arrangement of buttons, tiles or icons for the words and/or names in the controlled vocabulary, and in which the logger or annotator's window or UI includes tools to enable the logger or annotator to define in and out points or stop and start points for a video clip or video section associated with specific metadata or commentary.

21. The method of claim 1, in which the NLE automatically generates a highlights reel, or other sequence or clip or clips of video that has defined characteristics.

22. The method of claim 1, in which the real-time video shown in the window or UI is taken from the same camera that provides the real-time video shown on the second computing device.

23. The method of claim 1, (i) in which the real-time video is from one or more cameras filming a sports event; or (ii)

in which the real-time video is from one or more cameras filming a lesson or educational event; or (iii) in which the real-time video is from one or more cameras filming a news event; or (iv) in which the real-time video is from one or more security cameras; or (v) in which the real-time video is from one or more courtroom cameras; or (vi) in which the real-time video is from one or more cameras filming a medical examination or medical procedure; or (vii) in which the real-time video is from a video sharing website, such as YouTube.

24. The method of claim 1, in which step (i) further includes receiving time-stamped metadata or commentary from entry from an automated logger or from an automated annotator.

25. The method of claim 1 in which the controlled vocabulary can be fixed or can be dynamically updated.

26. The method of claim 1 in which the controlled vocabulary is hierarchical and enables searching in respect of concepts or items at any level of the hierarchy.

27. The method of claim 1 in which the controlled vocabulary is mined and managed automatically.

28. The method of claim 1 in which the controlled vocabulary is in part derived from or enriched by social media content.

29. The method of claim 1 in which the controlled vocabulary includes domain specific data.

30. The method of claim 29 in which the domain specific data includes information on different sports team and players on each team for a specific game or event captured by the real-time video being annotated.

31. A computer system including a first computing device and a second computing device, wherein (i) the first computing device is configured to display a real-time video in a non-linear editing environment in a window or user interface (UI) of the first computing device, in which the real-time video is generated remotely to the first computing device, and wherein the first computing device is configured to receive time-stamped metadata or commentary from entry from a logger or annotator at the first computing device, in which commentary is received from the logger or annotator, wherein the second computing device is configured such that an editor's window or UI of the non-linear editing environment on the second computing device enables definition of clip boundaries, e.g. in and out points, based on the time-stamped metadata or commentary, or wherein the second computing device is configured such that an editing application on the second computing device automatically generates clip boundaries, e.g. in and out points, based on the time-stamped metadata or commentary, and the first computing device is configured to receive commentary comprising received selected words from a controlled vocabulary displayed on the window or UI at the first computing device to ensure consistency and eliminate ambiguity, the first computing device configured to automatically stamp with provenance data that includes time, or to identify with provenance data that includes time, the controlled vocabulary, wherein the first computing device is operable to revert to a precise version of the controlled vocabulary; in which the controlled vocabulary is derived from a semantic description or from a semantic schema; and (ii) the second computing device is configured to receive and to automatically display the metadata or commentary on a timeline or other time-based index in a different window or user interface of the second computing device which is usable by a viewer or editor of the real-time video; and the second computing device is configured such that the window or UI of the second computing device returns or filters a list or set of video or clips that each include metadata or commentary matching a specific search term.

* * * * *